Patented Feb. 9, 1943

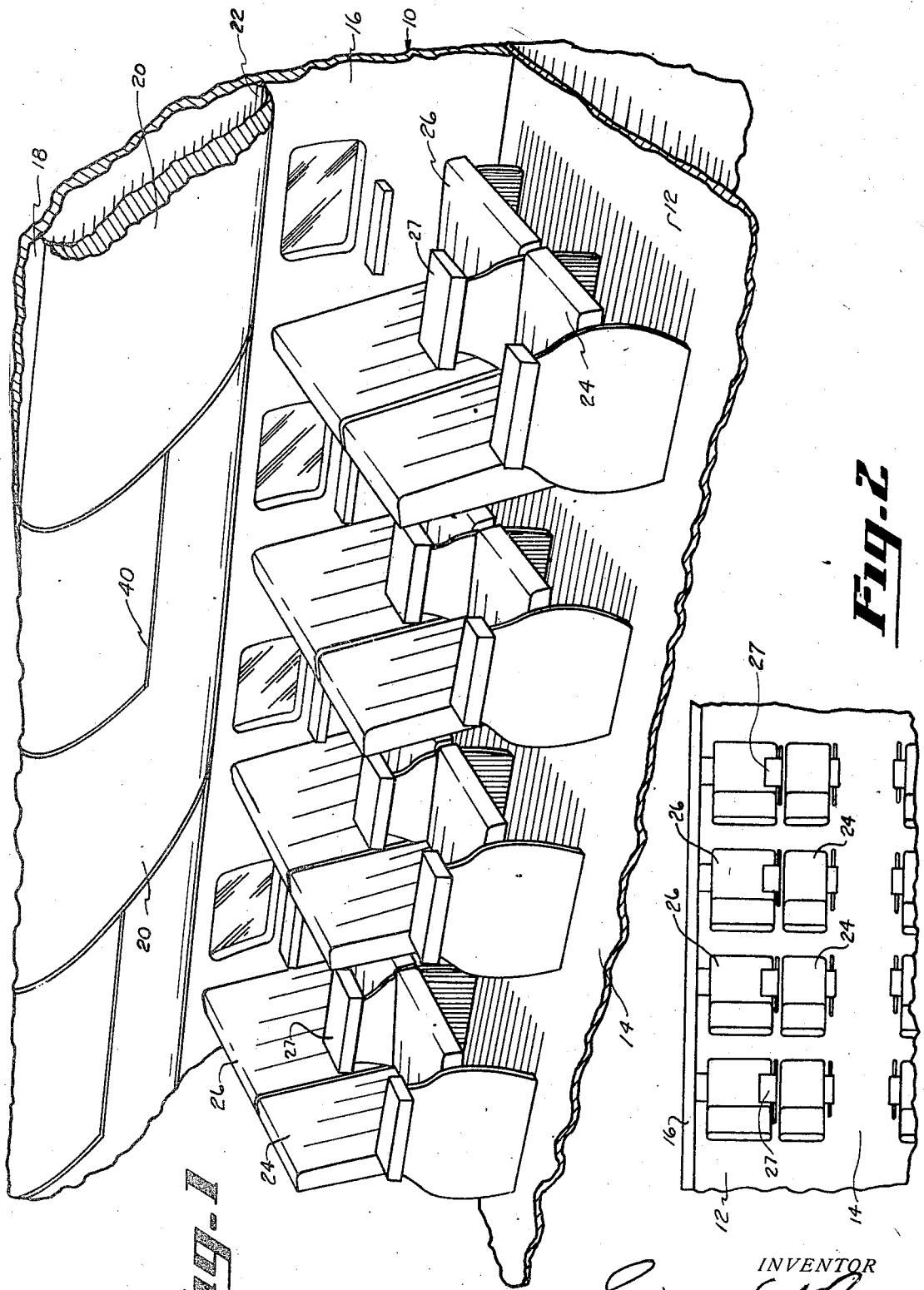

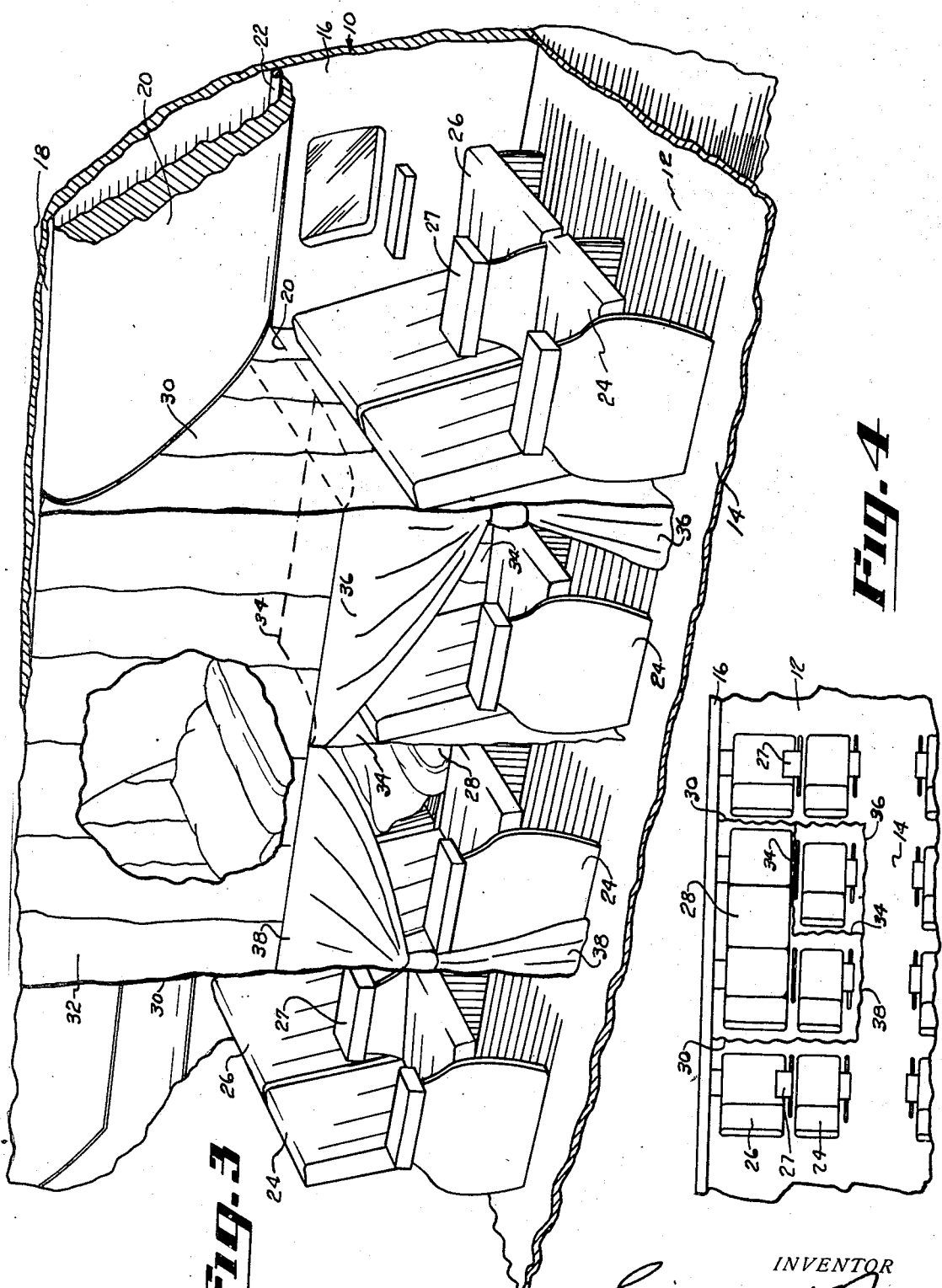

2,310,573

UNITED STATES PATENT OFFICE 2,310,573

AIRCRAFT CABIN

Edward F. Burton, Los Angeles, Calif., assignor to Douglas Aircraft Company, Inc., Santa Monica, Calif.

Application September 9, 1939, Serial No. 294,145

5 Claims. (Cl. 244—118)

My invention relates to an improved arrangement for berths and chairs such as are used in railway cars and transport airplanes, whereby a dressing space is provided adjacent each berth for the use of the respective berth occupant.

In aircraft cabins, particularly, space is necessarily limited thereby obviating the use of sufficiently large combination dressing rooms and lavatories as is more feasible in railway coaches. Therefore, I have devised an arrangement whereby individual berths may be provided with adjacent individual spaces for dressing. The accomplishment of such an arrangement is the principal object of my invention.

Other objects of my invention are to provide a lower berth compartment which includes, in addition to the berth, a chair within the single enclosure; to furnish an upper berth occupant with a private chair beneath his berth in which he may sit even though the corresponding lower berth is made up; and to accomplish the above mentioned objects without necessitating the use of an undesirable daytime arrangement.

Other objects will become apparent in the subjoined detail description and in the accompanying drawings in which:

Figure 1 is a perspective view of a portion of an aircraft cabin seating arrangement wherein the backs and cushions of certain of the seats are cooperatively movable to form lower berths.

Figure 2 is a plan view of the same portion of the cabin illustrated in Figure 1 and showing a central aisle.

Figure 3 is a perspective view of the same portion of the cabin illustrated in Figure 1 wherein an upper berth is lowered from the cabin ceiling into sleeping position and two of the convertible seats now form a lower berth, curtains being installed to form various compartments; and Figure 4 is a plan view of the seat and berth arrangement of Figure 3.

With reference to the drawings, I show a portion of an aircraft cabin 10 having a floor 12, a longitudinally extending central aisle 14, a wall 16 and a ceiling 18. The ceiling of the cabin is such that upper berths 20 may be folded about a hinge 22 on the cabin wall into a stowed position as shown in Figure 1 when their use is not desired.

Two rows of seats are provided on either side of the central aisle 14 and extend from one extremity of the cabin to the other. The seats forming the row adjacent the aisle and indicated by the numeral 24 are of lesser width than the seats forming the row adjacent the cabin wall which are indicated by the numeral 26. However, owing to wide arm rests 27 which extend partially over seats 26 the actual available seating width of seats 26 is no greater than that of seats 24. The advantage of this arrangement is evidenced by the fact that normal seating widths are available and from the same seats wide berths can be prepared.

The narrower seats 24 are not adjustable for forming a bed, the berth being formed through adjustment of the back and seat cushions of the two longitudinally adjacent wider chairs which are located directly below each lower berth.

Inasmuch as the conversion of two longitudinally adjacent seats into a single berth is old in the art, I am not concerned with that particular problem, but rather, my invention consists in the arrangement of the seats with respect to each other and with respect to the upper berth, and with the arrangement of partitions to separate the various seats and berths.

In making up the compartment of my invention, the two longitudinally adjacent seats 26 are converted into a lower berth 28, the wide arm rest being removed from each seat during the conversion as shown in Figures 3 and 4. Then the upper berth 20 is lowered into a horizontal plane, in which position it extends laterally from the cabin wall to the aisle edge. Next a curtain 30 is hung from the ceiling 18 of the cabin to the floor 12 at each end of the upper and lower berths 20, 28 thereby forming a compartment separated from the longitudinally adjacent portions of the cabin. Another curtain 32 is then hung from the ceiling of the cabin to the bottom of the upper berth at the aisle edge thereby completely enclosing the upper berth section.

With the above mentioned curtains hung, only the lower berth section and the two narrower chairs 24 are open to the aisle. In the complete fulfillment of my arrangement then, it is necessary to partition off one of the chairs 24. This is done by hanging a curtain 34 from the bottom side of the upper berth, at a location in which it will hang from the upper berth to the floor, between the lower berth and the chair 24 which is to be partitioned. This curtain is then extended laterally toward the aisle at substantially a right angle or in other words is brought around the back of the chair to the aisle. The chair is then enclosed in a rectangular space open to the aisle, which opening may or may not be covered with a curtain such as that shown at 36 hanging from the aisle edge of the upper berth to the floor. This provides a completely enclosed compartment for the use of the upper berth occupant both as a dressing room and as a place to sit should he not wish to retire at the same time as the lower berth occupant.

It may now be seen that with the end curtains 30 and the curtain 34 in place, an L shaped compartment remains containing the lower berth and one of the narrower chairs 24 which provides a dressing room for the lower berth occupant. A curtain 38 is provided which is similar to the curtain 36, for closing the aisle opening to the lower berth compartment.

All of the curtains may be hung by snap fasteners or similar means. The curtain 34 may be mounted in such a manner as to traverse an L shaped track 40 on the bottom side of the berth. In this way the installation and removal of the curtain would be simplified inasmuch as it could merely be threaded in and out of the track as desired. The track may be easily worked into a design on the bottom side of the berth wherein it would not be objectionable to the eye when the cabin is not being used as a sleeper or, in other words, when the upper berth is stowed.

While I have described my invention in its present preferred embodiment, it is obvious that various modifications such as other partitioning means might be employed without departing from the general spirit of the invention set forth in the appended claims.

I claim:

1. In a sleeping arrangement for aircraft; a pair of chairs in side by side relation; one of said chairs being of greater width than the other; a similar pair of chairs in side by side relation and longitudinally spaced from said first pair of chairs; adjustable back and seat cushions on each of said wider chairs, said cushions being cooperatively movable to form a lower berth; an upper berth above said two pairs of chairs, said upper berth being hinged to swing upward for stowing purposes and downward for sleeping purposes; primary partitioning means adapted to enclose said entire group of berths and chairs, and secondary partitioning means adapted to singly enclose one of said narrower chairs, whereby the other of said narrower chairs is included in a compartment with said lower berth.

2. In an aircraft cabin having a central longitudinally extending aisle: a double row of chairs on either side of said aisle; the chairs in each outboard row being of greater width than the chairs in each inboard row; a row of upper berths foldable into the ceiling of said cabin on either side of said aisle, each of said upper berths being lowerable into a horizontal plane for sleeping purposes, the position of each berth when lowered being directly above two pairs of longitudinally spaced chairs and extending from the cabin wall to the aisle edge; adjustable back and seat cushions on each of said wider chairs, said cushions of the two longitudinally spaced chairs directly below said upper berth being cooperatively movable to form a lower berth; flexible partitioning means for excluding the sets of upper and lower berth units thus formed including their two narrower chairs from the respective longitudinally adjacent sets of berth units and chairs; a second partitioning means for separating the upper berth and one of said narrower chairs from the said cabin aisle; and a third partitioning means for separating the other of said narrower chairs from the first said narrower chairs and the lower berth formed from the two said wider chairs; whereby the one said narrower chair is enclosed in a compartment with the said lower berth, the upper berth is singly enclosed, and the other said narrower chair is singly enclosed in a compartment open only to the aisle.

3. In an aircraft cabin having a central, longitudinally extending aisle: a sleeping arrangement comprising an upper berth extending in width from the cabin wall to the aisle edge; a lower berth directly below said upper berth and extending in width from the cabin wall to within approximately a chair width of said aisle edge; a partitioning means extending from the cabin ceiling to the floor and from the cabin wall to the aisle edge at each end of the berths; a second partitioning means extending from the ceiling to the bottom of the upper berth for separating the said upper berth from the aisle; a third partitioning means contained in a vertical plane which passes through the edge of the lower berth, extending from the bottom of the upper berth to the floor and from one end of the upper berth to a position substantially half the berth's length, and thence extending laterally to the aisle edge of the upper berth; and a fourth partitioning means composed of two parts extending from the aisle edge of the upper berth to the floor and respectively from opposite ends of said berth to substantially the center of said berth, whereby all of said partitioning means cooperate to form a single enclosure for said upper berth, a single enclosure for said lower berth including a dressing space for the occupant of same and a single enclosure serving as a dressing space for the occupant of said upper berth.

4. In an aircraft cabin having a central longitudinally extending aisle; a double row of chairs on either side of said aisle; the chairs in each outboard row being of greater width than the chairs in each inboard row; each transverse pair of seats having a common armrest which armrest extends over the said wider chair to such a position that the net seating width is substantially equal in the said wider and said narrower chairs.

5. In a sleeping arrangement for aircraft, a pair of chairs in side by side relation, one of said chairs being of greater width than the other, a similar pair of chairs in side by side relation and longitudinally spaced from said first pair of chairs, adjustable back and seat cushions on each of said wider chairs, said cushions being cooperatively movable to form a berth for sleeping, first partitioning means enclosing both pairs of chairs in a single group, and secondary partitioning means within said first partitioning means for separating one chair of one of said pairs of chairs from the rest of the group.

EDWARD F. BURTON.